(12) United States Patent
Maruyama et al.

(10) Patent No.: US 9,335,490 B2
(45) Date of Patent: May 10, 2016

(54) OPTICAL DEVICE AND FABRICATION METHOD OF OPTICAL DEVICE

(71) Applicant: FUJITSU OPTICAL COMPONENTS LIMITED, Kawasaki-shi, Kanagawa (JP)

(72) Inventors: Shinji Maruyama, Sapporo (JP);
Yoshihiko Yoshida, Sapporo (JP);
Tomoyuki Ito, Hong Kong (CN);
Yoshihiro Takahashi, Sapporo (JP);
Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/329,026

(22) Filed: Jul. 11, 2014

(65) Prior Publication Data
US 2015/0016771 A1  Jan. 15, 2015

(30) Foreign Application Priority Data

Jul. 12, 2013  (JP) ................. 2013-147114

(51) Int. Cl.
*G02B 6/42* (2006.01)
*H04B 10/50* (2013.01)
*G02B 6/12* (2006.01)

(52) U.S. Cl.
CPC  *G02B 6/42* (2013.01); *H04B 10/50* (2013.01); *G02B 6/4214* (2013.01); *G02B 2006/12166* (2013.01); *G02F 2201/58* (2013.01); *Y10T 29/49128* (2015.01)

(58) Field of Classification Search
CPC ............. G02B 2006/12166; G02B 2006/42; G02B 2006/4214; G02B 6/4214; G02F 1/00; G02F 2201/58; Y10T 29/49128; H04B 10/50
USPC ............................................. 29/831; 385/14
See application file for complete search history.

(56) References Cited

U.S. PATENT DOCUMENTS

| | | | | |
|---|---|---|---|---|
| 3,998,687 A | * | 12/1976 | Ballman et al. | 117/66 |
| 5,953,477 A | * | 9/1999 | Wach et al. | 385/115 |
| 6,144,791 A | * | 11/2000 | Wach et al. | 385/123 |
| 6,222,970 B1 | * | 4/2001 | Wach et al. | 385/115 |
| 6,530,698 B1 | * | 3/2003 | Kuhara et al. | 385/88 |
| 6,567,590 B1 | * | 5/2003 | Okada et al. | 385/49 |
| 7,933,478 B2 | * | 4/2011 | Wei et al. | 385/38 |
| 8,137,572 B2 | * | 3/2012 | Wei et al. | 216/24 |
| 2001/0012429 A1 | * | 8/2001 | Wach et al. | 385/115 |
| 2001/0053260 A1 | * | 12/2001 | Takizawa et al. | 385/14 |

(Continued)

FOREIGN PATENT DOCUMENTS

| JP | 2001-141965 | | 5/2001 | |
|---|---|---|---|---|
| JP | 2001141965 A | * | 5/2001 | ............... G02B 6/42 |

(Continued)

*Primary Examiner* — Peter Radkowski
(74) *Attorney, Agent, or Firm* — Staas & Halsey LLP

(57) ABSTRACT

An optical device includes a substrate having an electrooptical effect, and including an optical waveguide that guides light and a reflection groove having a bottom face that reflects light output from the optical waveguide; and a light-receiving element positioned above the reflection groove and fixed to the substrate. The light output from the optical waveguide into the reflection groove is reflected by the bottom face of the reflection groove while traveling through a space inside the reflection groove and is incident to the light-receiving element.

9 Claims, 19 Drawing Sheets

(56) References Cited

U.S. PATENT DOCUMENTS

2008/0138007 A1 6/2008 Okubo et al.
2009/0214170 A1* 8/2009 Wei et al. ........................ 385/129
2010/0025361 A1* 2/2010 Wei et al. ........................ 216/2

FOREIGN PATENT DOCUMENTS

| JP | 2003-243444 | | 8/2003 | |
|----|-------------|---|--------|---|
| JP | 2003243444 A | * | 8/2003 | .............. H01L 21/60 |
| JP | 2008-145684 | | 6/2008 | |

* cited by examiner

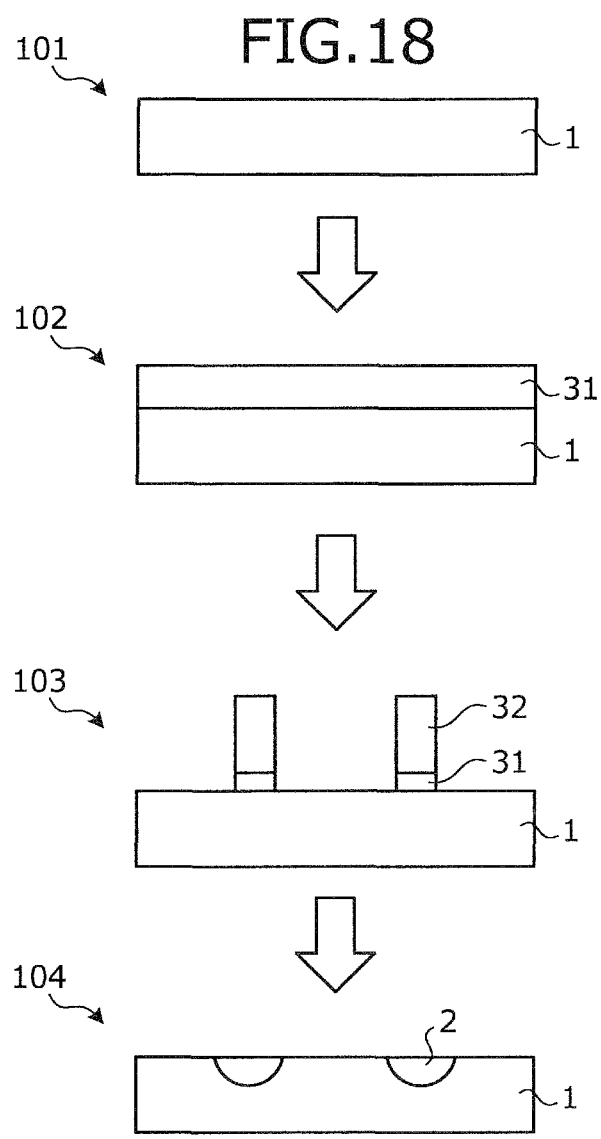

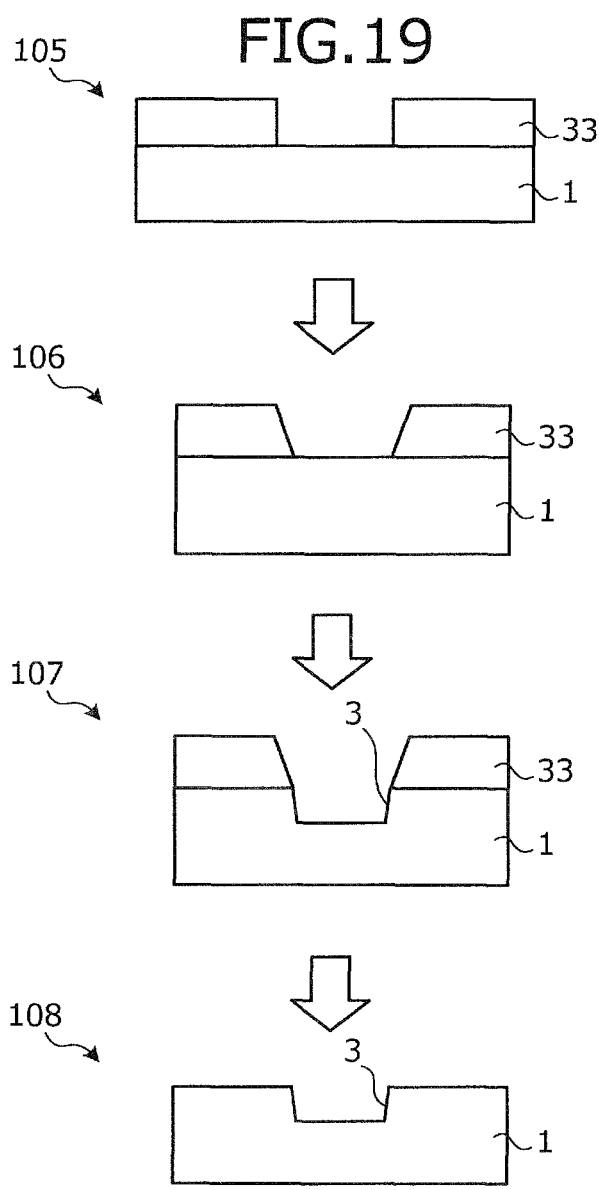

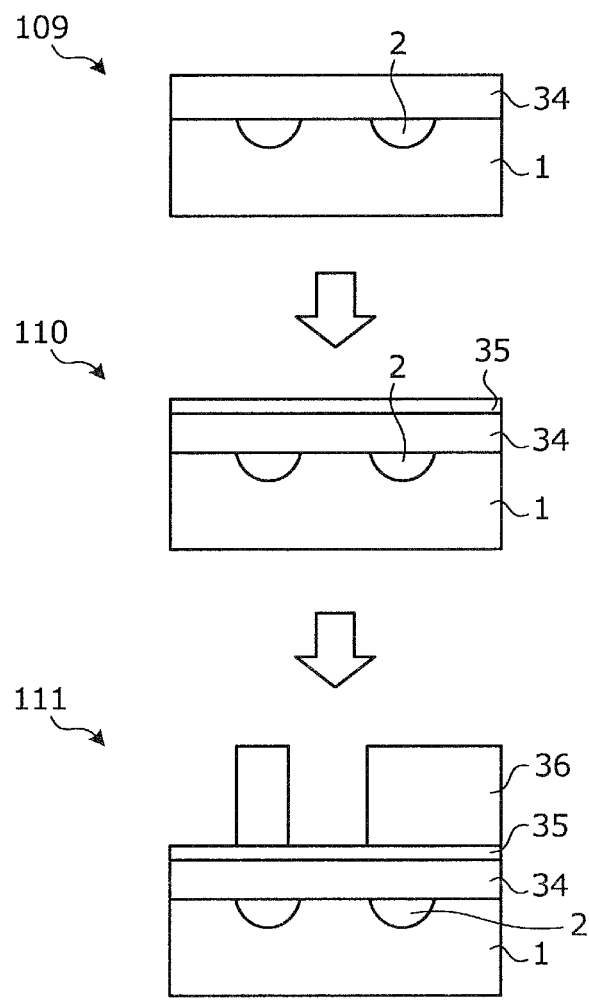

US 9,335,490 B2

OPTICAL DEVICE AND FABRICATION METHOD OF OPTICAL DEVICE

CROSS REFERENCE TO RELATED APPLICATIONS

This application is based upon and claims the benefit of priority of the prior Japanese Patent Application No. 2013-147114, filed on Jul. 12, 2013, the entire contents of which are incorporated herein by reference.

FIELD

The embodiments discussed herein are related to an optical device and a fabrication method of the optical device.

BACKGROUND

In a conventional structure, in disposing a light-receiving element that receives light output from an optical waveguide in front of or at the side of a substrate having the optical waveguide, the light-receiving element may be disposed outside the substrate. According to such a structure, because the light-receiving element is attached to the substrate as an external element, the overall size of an optical device package including the light-receiving element increases.

According to a disclosed technique, a structure in which a chip is mounted on a substrate by flip-chip bonding and an underfill agent fills a gap between the chip and the substrate, a groove formed on the substrate prevents the ingress of the underfill agent (such as adhesive) into an area where the presence of the underfill agent is undesirable (see, e.g., Japanese Laid-Open Patent Publication No. 2003-243444). According to another disclosed technique, a projection formed on an end of an optical waveguide prevents an adhesive from flowing to a reflection surface on the end of the optical waveguide (see, e.g., Japanese Laid-Open Patent Publication No. 2008-145684).

The light-receiving element may be bonded to the surface of the substrate by, for example, an adhesive, instead of being disposed outside the substrate. In such a structure, the light-receiving element can be included within the area of the size of the substrate, enabling a reduction in the size of the package. However, if light emitted from the optical waveguide and incident on the light-receiving element passes through the adhesive containing air bubbles, light is reflected irregularly by the air bubbles. As a result, the quantity of light received by the light-receiving element decreases. If a groove is formed on the substrate to prevent the adhesive from flowing into a light path leading from the optical waveguide to the light-receiving element and the groove cannot be formed as a groove traversing the optical waveguide, the inflow of the adhesive to the light path may be impossible to prevent.

SUMMARY

According to an aspect of an embodiment, an optical device includes a substrate having an electrooptical effect, and including an optical waveguide that guides light and a reflection groove having a bottom face that reflects light output from the optical waveguide; and a light-receiving element positioned above the reflection groove and fixed to the substrate. The light output from the optical waveguide into the reflection groove is reflected by the bottom face of the reflection groove while traveling through a space inside the reflection groove and is incident to the light-receiving element.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 18, 19, and 20 depict an example of a fabrication method for the optical device according to the embodiment.

DESCRIPTION OF EMBODIMENTS

Figure 1:
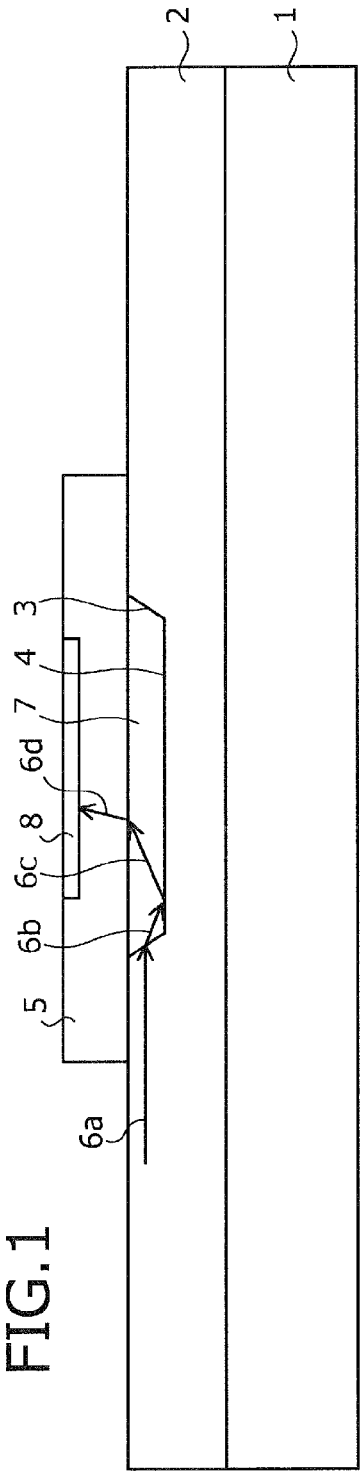
FIG. 1 depicts an example of an optical device according to an embodiment.

Embodiments of an optical device and a fabrication method thereof will be described in detail with reference to the accompanying drawings. In the following embodiments, identical constituent elements are given the same reference numerals and redundant description thereof is omitted.

FIG. 1 depicts an example of an optical device according to an embodiment. As depicted in FIG. 1, the optical device includes a substrate 1, an optical waveguide 2 that guides light, and a reflection groove 3 that reflects light, the optical waveguide 2 and reflection groove 3 being disposed on the substrate 1. The substrate 1 has an electrooptical effect. For example, a Z-cut crystal substrate made of LiNbO$_3$ (hereinafter "LN") or LiTaO$_2$ is an example of the substrate 1 having an electrooptical effect.

The reflection groove 3 is formed on part of the optical waveguide 2. The reflection groove 3 has a bottom face 4 that reflects light output from the optical waveguide 2. A light-receiving element 5 is located above the reflection groove 3 and is fixed to the substrate 1. For example, a photodiode (PD) is an example of the light-receiving element 5.

In the optical device depicted in FIG. 1, light 6a making up at least part of light traveling through the optical waveguide 2 is refracted at an end face of the reflection groove 3 at an angle of refraction determined by the medium of the optical waveguide 2 and the medium of a space 7 inside the reflection groove 3, and enters the reflection groove 3. Light 6b having entered the reflection groove 3 proceeds further toward the bottom face 4 of the reflection groove 3 and is reflected by the bottom face 4 of the reflection groove 3 while traveling through the space 7 inside the reflection groove 3.

Light 6c reflected by the bottom face 4 of the reflection groove 3 travels upward. In the example depicted in FIG. 1, because the light-receiving element 5 is, for example, a rear face incident element, the light 6c reflected by the bottom face 4 of the reflection groove 3 is refracted at the rear face of the light-receiving element 5 at an angle of refraction determined by the medium of the space 7 inside the reflection groove 3 and the medium of the light-receiving element 5, and is incident to the light-receiving element 5. Light 6d incident to the light-receiving element 5 travels further to become incident on a light-receiving unit 8.

According to the optical device depicted in FIG. 1, light output from the optical waveguide 2 is reflected by the bottom face 4 of the reflection groove 3 and then travels upward. As a result, light traveling through the optical waveguide 2 can be received by the light-receiving element 5 fixed to the surface of the substrate 1.

The optical device depicted in FIG. 1 can be apply to, for example, such an optical device as an LiNbO$_3$ external modulator (hereinafter "LN modulator"), an optical modulator using a polymeric material and a semiconductor material, such as InP and Si, or a Mach-Zehnder variable optical attenuator formed of a planar lightwave circuit (PLC). A case of applying the optical device depicted in FIG. 1 to, for example, an LN modulator for coherent communication having an optical polarization division multiplexing function will hereinafter be described.

Figure 2:
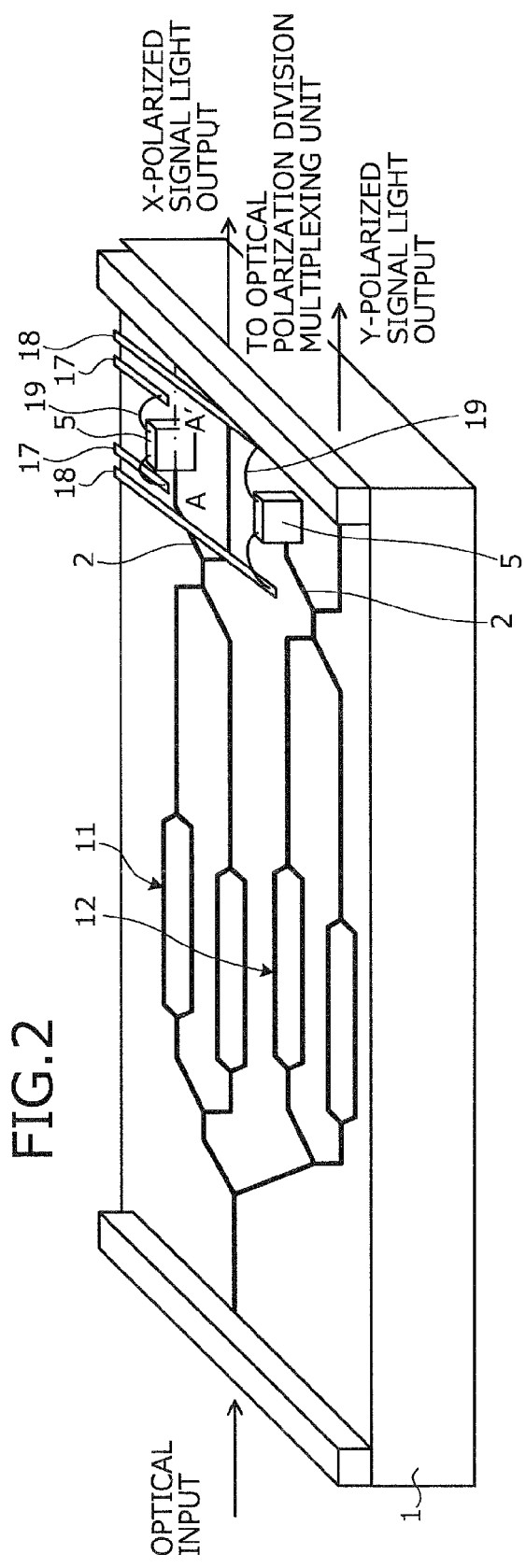
FIG. 2 depicts a first example of an LN modulator according to the embodiment.
Figure 3:
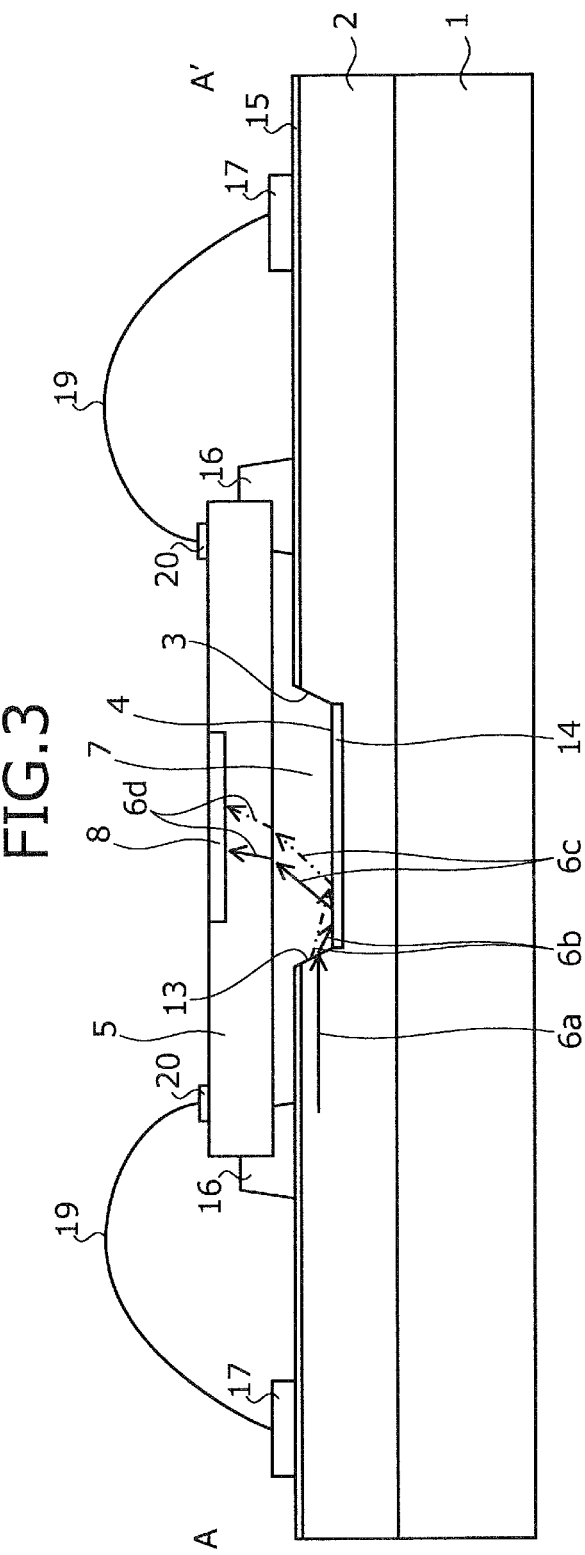
FIG. 3 depicts a section of the LN modulator made along a cutting line A-A' in FIG. 2.

FIG. 2 depicts a first example of an LN modulator according to the embodiment. FIG. 3 depicts a section of the LN modulator made along a cutting line A-A' in FIG. 2 in the direction of thickness of the substrate. The cutting line A-A' extends along the vicinity of the light-receiving element 5 in a direction parallel to the input direction of light passing through light-receiving element 5 and coming into the LN modulator or the output direction of signal light output from the LN modulator. Therefore, FIG. 3 depicts a section made by cutting the LN modulator along the vicinity of the light-receiving element 5 in a direction parallel to the input direction of light passing through light-receiving element 5 and coming into the LN modulator or the output direction of the signal light output from the LN modulator.

As depicted in FIGS. 2 and 3, the LN modulator includes, for example, an optical waveguide 11 for X-polarization IQ modulation and an optical waveguide 12 for Y-polarization IQ modulation that are formed on the substrate 1. On the optical waveguide 11 for X-polarization IQ modulation and the optical waveguide 12 for Y-polarization IQ modulation, electrodes for modulation are formed respectively (which are not depicted). The optical waveguide 11 for X-polarization IQ modulation outputs X-polarized signal light, while the optical waveguide 12 for Y-polarization IQ modulation outputs Y-polarized signal light. The X-polarized signal light and Y-polarized signal light coming out of an LN modulation area, for example, may be multiplexed at an optical polarization division multiplexing unit.

The light-receiving element 5 for monitoring is disposed on the optical waveguide 2 to monitor branching from the optical waveguide 11 for X-polarization IQ modulation and on the optical waveguide 2 to monitor branching from the optical waveguide 12 for Y-polarization IQ modulation.

The reflection groove 3 is formed below the light-receiving element 5 on the optical waveguide 2, which is for monitoring. The reflection groove 3 may be formed to have a depth that is less than the thickness of the optical waveguide 2, or may be formed to have a depth equal to the thickness of the optical waveguide 2. The depth of the reflection groove 3 may be, for example, about 1 to 15 micrometers. The reflection groove 3 of about 1 to 15 micrometers in depth causes the light 6a making up at least part of the light traveling through the optical waveguide 2 to enter the reflection groove 3. In the space 7 inside the reflection groove 3, a part through which light travels may be filled with air.

In the reflection groove 3, the end face that outputs the light from the optical waveguide 2 is formed into a sloped surface 13 that refracts the light output from the optical waveguide 2 to cause the light to proceed toward the bottom face 4 of the reflection groove 3. Thus, the light 6b output from the optical waveguide 2 and entering the reflection groove 3 is caused to proceed toward the bottom face 4 of the reflection groove 3.

With respect to the direction of thickness of the substrate 1, the sloped surface 13 forms an angle that is less than the angle at which the light 6a traveling through the optical waveguide 2 is totally reflected by the reflection surface 13. For example, when the part through which light travels is filled with air in the space 7 inside the reflection groove 3, since the LiNbO$_3$ and air have refractive index of 2.2 and 1, respectively, a refractive index difference between the media results. Because of this difference, the light 6a traveling through the optical waveguide 2 is totally reflected by the reflection surface 13 at an angle of 27.85 degrees with respect to the direction of thickness of the substrate 1.

Therefore, the angle between the sloped surface 13 and the direction of thickness of the substrate 1 may be less than 27.85 degrees. If the sloped surface 13 is sloped at an angle less than 27.85 degrees with respect to the direction of thickness of the substrate 1, the light 6a traveling through the optical waveguide 2 is prevented from being totally reflected by the sloped surface 13, thereby allows the light 6a traveling through the optical waveguide 2 to enter the reflection groove 3.

The angle that the sloped surface 13 makes with respect to the direction of thickness of the substrate 1 may be set to, for example, 5 degrees or more to 20 degrees or less. In this case, even if the slope angle of the sloped surface 13 deviates from a set slope angle consequent a manufacturing error of the reflection groove 3, the angle that the sloped surface 13 makes with respect to the direction of thickness of the substrate 1 is kept smaller than the angle of total reflection, i.e., 27.85 degrees.

The inner surface of the reflection groove 3, excluding the sloped surface 13 that outputs light from the optical waveguide 2, is covered with a reflection film 14. This reflection film 14 improves the reflectance of the bottom face 4 of the reflection groove 3, thus increasing the quantity of the light 6c reflected by the bottom face 4 of the reflection groove 3. The reflection film 14 may be made of a metal, such as Au (gold).

The reflection film 14 serves as a masking film that blocks light trying to travel through the bottom face 4 of the reflection groove 3 into the reflection groove 3. This prevents, among the light 6a traveling through the waveguide 2, the part that does not come out of the sloped surface 13 of the reflection groove 3 but travels further through the waveguide 2, from leaking through the bottom face 4 of the reflection groove 3 into the reflection groove 3.

A buffer layer/Si layer 15 may be formed on the surface of the substrate 1. Among the buffer layer/Si layer 15, for example, the buffer layer prevents light absorption loss caused by an electrode or electric interconnect formed on the surface of the substrate and allows impedance matching. The Si layer, for example, suppresses temperature drift. The light-receiving element 5 may be fixed to the substrate 1 by bonding the rear face of the light-receiving element 5 to the buffer layer/Si layer 15 using, for example, an adhesive 16.

The surface of the substrate 1, or, strictly speaking, the surface of the buffer layer/Si layer 15 carries electric interconnects 17 and 18 for light-receiving elements and electrodes (not depicted) disposed on the optical waveguide 11 for X-polarization IQ modulation and the optical waveguide 12 for Y-polarization IQ modulation, respectively. To the electric interconnects 17 and 18 for light-receiving elements, one end of metal wires 19 are respectively connected by wire bonding. The other ends of the wires 19 are connected to the electrodes 20 serving as cathodes or anodes of the light-receiving elements 5, by wire bonding. This means that the electric interconnects 17 and 18 for light-receiving elements and the light-receiving elements 5 are electrically connected to each other via the wires 19. The electric interconnects 17 and 18 for light-receiving elements are electrically connected to a terminal of the package housing the LN modulator therein.

At least part of the electrodes 20 of the light-receiving element 5 may be placed on the adhesive 16 so that the adhesive 16 supports the electrodes 20 of the light-receiving element 5 from below. Such arrangement causes ultrasonic waves to act on the electrodes 20 of the light-receiving element 5 more strongly during a wire bonding process than a case where a space under the electrodes 20 of the light-receiving element 5 is left hollow and therefore, improves the bonding strength of the wires 19 wire bonded to the electrodes 20.

According to the LN modulator depicted in FIGS. 2 and 3, the light 6b output from the optical waveguide 2 and entering the reflection groove 3 is reflected by the reflection film 14 on the bottom face 4 of the reflection groove 3 and travels upward. As a result, light traveling through the optical waveguide 2 can be received by the light-receiving element 5 fixed to the surface of the substrate 1. According to the LN modulator depicted in FIGS. 2 and 3, the part through which light travels in the space 7 inside the reflection groove 3 is filled with air, so that the part through which light travels contains no substance that causes irregular reflection of light, such as air bubbles in an adhesive. Such configuration enables light traveling through the space 7 inside the reflection groove 3 to fall onto the light-receiving element 5 without being reflected irregularly. Thus, the quantity of light received by the light-receiving element 5 increases.

For example, the optical sensitivity for monitoring light in a case of receiving light leaking out of the optical waveguide by the light-receiving element is about 50 mA/W. According to the LN modulator depicted in FIGS. 2 and 3, because of the increased quantity of light received by the light-receiving element 5, the light sensitivity for monitoring light is improved to an order of 200 mA/W. According to the LN modulator depicted in FIGS. 2 and 3, because the light-receiving element 5 is disposed on the surface of the substrate 1, the package housing the LN modulator therein can be made smaller than in the case of disposing the light-receiving element 5 outside the substrate 1.

Figure 4:
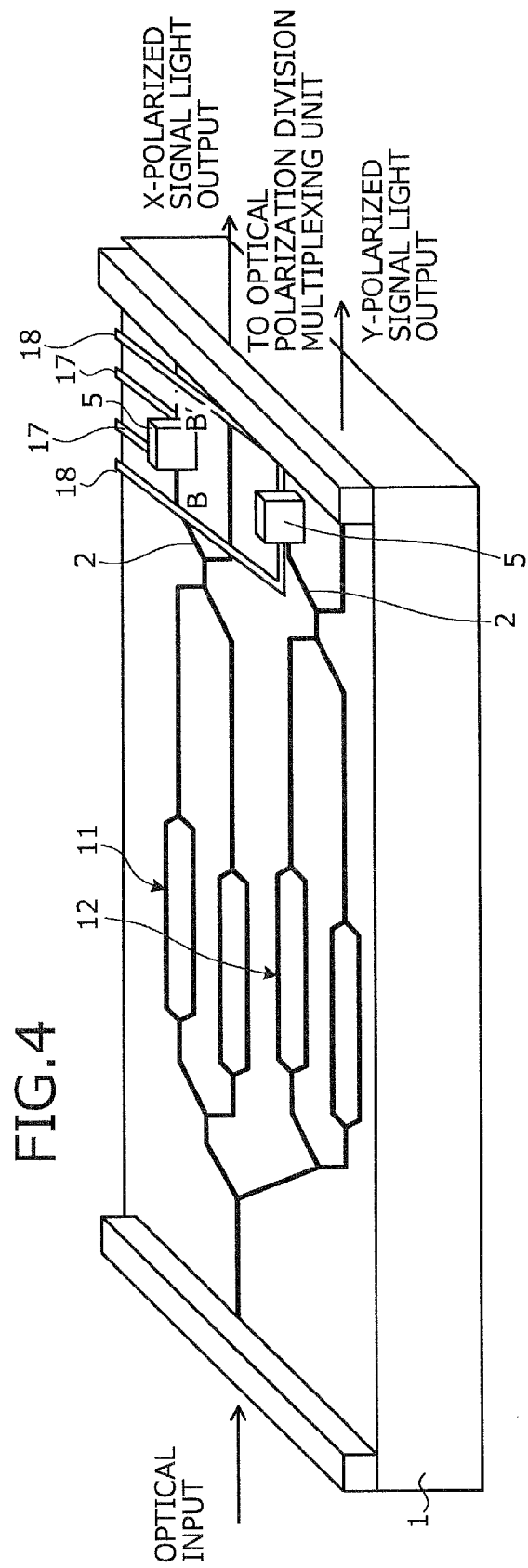
FIG. 4 depicts a second example of the LN modulator according to the embodiment.
Figure 5:
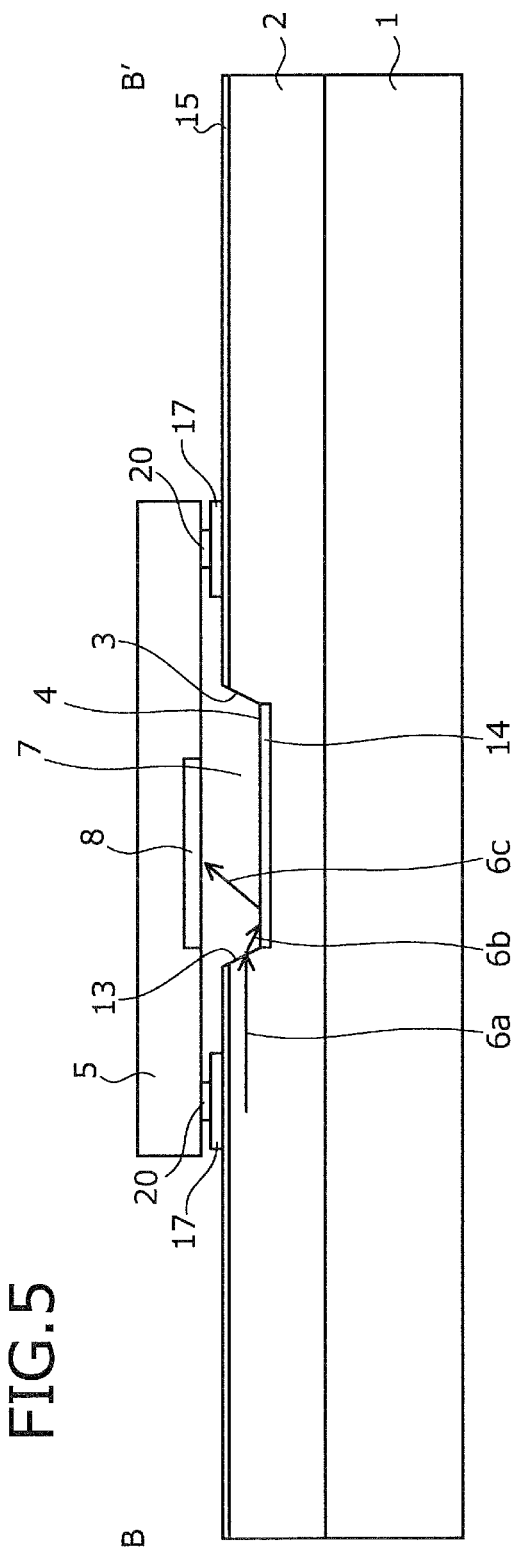
FIG. 5 depicts a section of the LN modulator made along a cutting line B-B' in FIG. 4.

FIG. 4 depicts a second example of the LN modulator according to the embodiment. FIG. 5 depicts a section of the LN modulator made along a cutting line B-B' in FIG. 4 in the direction of thickness of the substrate. The cutting line B-B' is the same as the cutting line A-A'above. FIG. 5, therefore, depicts the same section as depicted in FIG. 3.

As depicted in FIGS. 4 and 5, in the second example of the LN modulator, the light-receiving elements 5 are fixed to the substrate 1 such that the light-receiving units 8 face toward the bottom face 4 of the reflection groove 3 and such that the electrodes 20 of the light-receiving elements 5 and the electric interconnects 17 and 18 for light-receiving elements are electrically connected to each other by flip-chip bonding. The junctions between the electrodes 20 of the light-receiving elements 5 and the electric interconnects 17 and 18 for light-receiving elements may be filled with an underfill agent. The underfill agent increases the joining strength between the electrodes 20 of the light-receiving elements 5 and the electric interconnects 17 and 18 for light-receiving elements and thereby, enables the light-receiving elements 5 to be fixed firmly to the substrate 1.

In this case, however, if the underfill agent flows into the part through which light travels in the space 7 inside the reflection groove 3, air bubbles in the underfill agent may cause irregular reflection of light. It is therefore preferable that no underfill agent flow into the part through which light travels in the space 7 inside the reflection groove 3.

The light-receiving elements 5 are provided with a dummy electrode other than the electrodes 20 connected to the electric interconnects 17 and 18, and this dummy electrode may be joined to the substrate 1 by flip-chip bonding. This configuration also enables the light-receiving elements 5 to be fixed firmly to the substrate 1. When the joining strength is increased by providing the dummy electrode, use of the underfill agent becomes unnecessary. Thus, a case where the underfill agent flows into the part through which light travels in the space 7 inside the reflection groove 3 can be prevented.

Other constituent elements of the second example of the LN modulator are the same as those of the first example of the LN modulator of FIGS. 2 and 3, and are therefore not described.

According to the LN modulator depicted in FIGS. 4 and 5, even when the light-receiving element 5 is fixed to the surface of the substrate 1 by flip-chip bonding, light traveling through the optical waveguide 2 can be received by the light-receiving element 5. According to the LN modulator depicted in FIGS. 4 and 5, the mounting area of the light-receiving element 5 is reduced through flip-chip bonding, so that the LN modulator can be miniaturized. Therefore, the LN modulator of FIGS. 4 and 5 is suitable for applications with greater size reduction demands.

Figure 6:
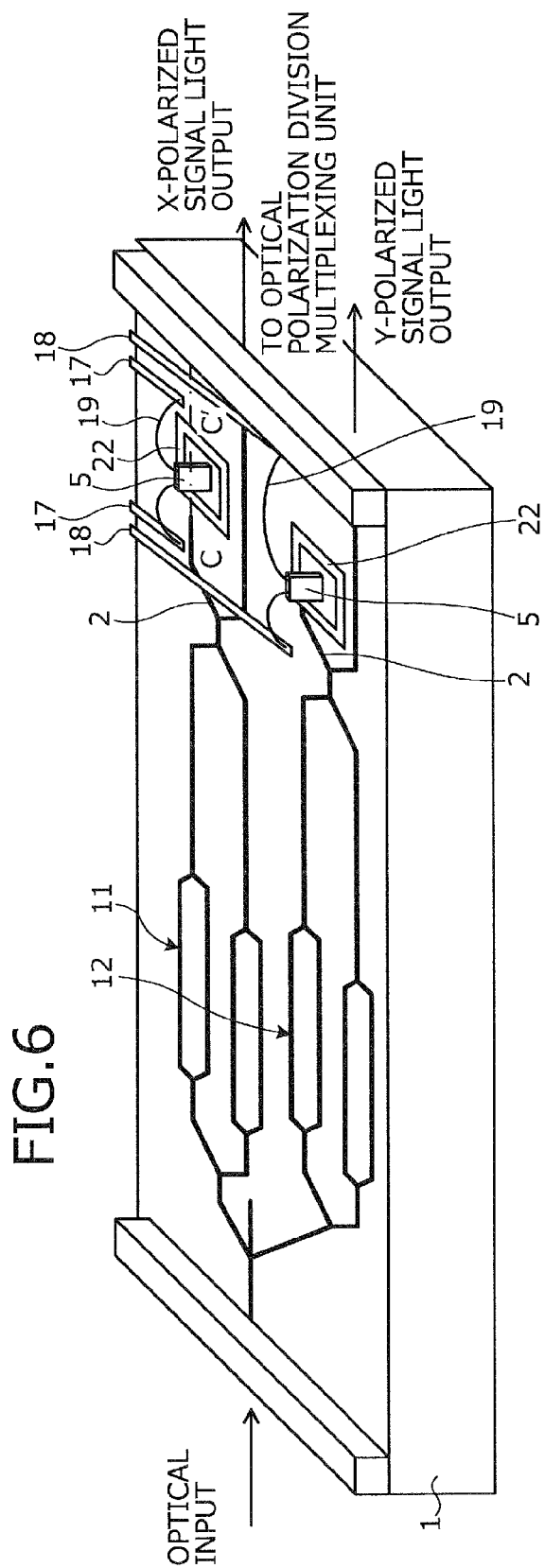
FIG. 6 depicts a third example of the LN modulator according to the embodiment.
Figure 7:
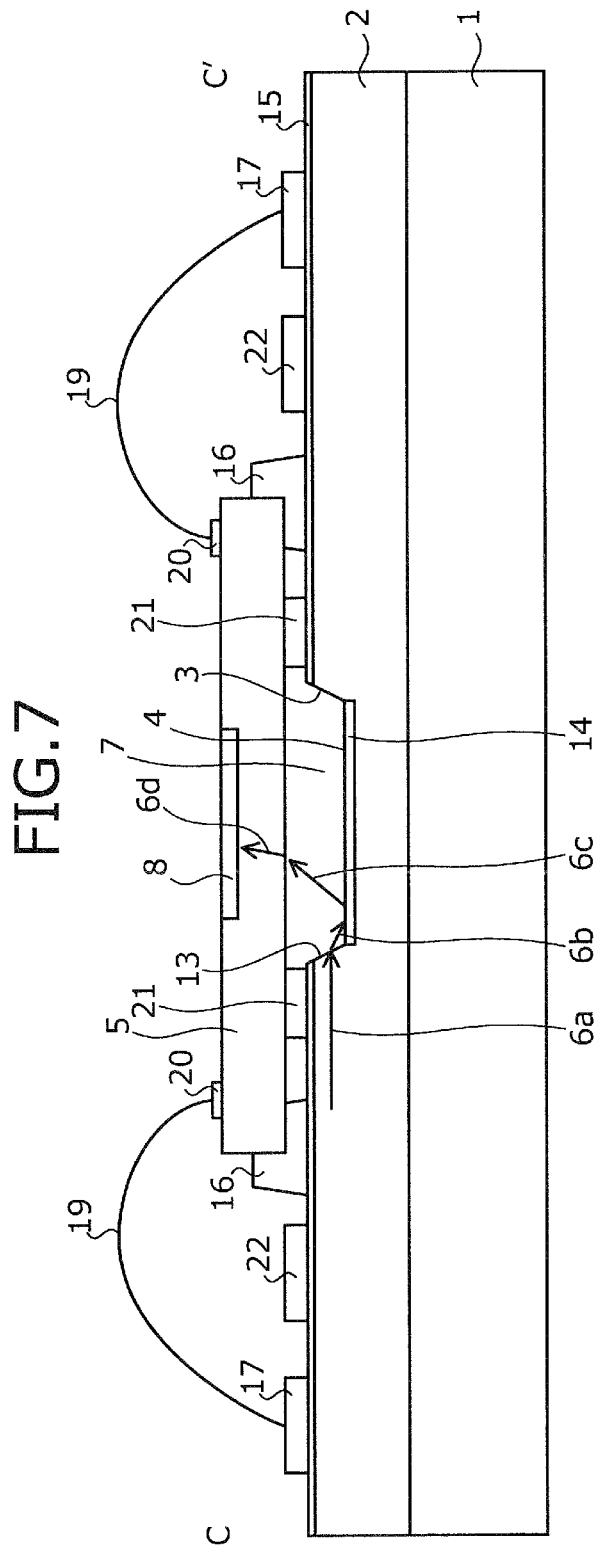
FIG. 7 depicts a section of the LN modulator made along a cutting line C-C' in FIG. 6.

FIG. 6 depicts a third example of the LN modulator according to the embodiment. FIG. 7 depicts a section of the LN modulator made along a cutting line C-C' in FIG. 6 in the direction of thickness of the substrate. The cutting line C-C' is the same as the cutting line A-A' above. FIG. 7, therefore, depicts the same section as depicted in FIG. 3.

As depicted in FIGS. 6 and 7, in the third example of the LN modulator, a reflection groove protecting projection 21 is formed around the reflection groove 3. The reflection groove protecting projection 21 projects from the surface of the substrate 1, for example, as a banked shape and may encompass the reflection groove 3 inside a bonding spot for bonding by the adhesive 16. The reflection groove protecting projection 21 may be made of, for example, the same material as the material of the electric interconnects 17 and 18 for light-receiving elements or the material of the modulating electrodes disposed on the optical waveguide 11 for X-polarization IQ modulation and the optical waveguide 12 for Y-polarization IQ modulation. For example, the reflection groove protecting projection 21 may be made of a metal, such as Au.

In the third example of the LN modulator, an interconnect protecting projection 22 may be formed between a bonding spot for bonding by the adhesive 16 and the electric interconnects 17 and 18 for light-receiving elements. The interconnect protecting projection 22 projects from the surface of the substrate 1, for example, as a banked shape and may encompass the light-receiving element 5 outside the bonding spot for bonding by the adhesive 16. The interconnect protecting projection 22 may be made of, for example, the same material as the material of the electric interconnects 17 and 18 for light-receiving elements or the material of the modulating electrodes disposed on the optical waveguide 11 for X-polarization IQ modulation and the optical waveguide 12 for Y-polarization IQ modulation. For example, the interconnect protecting projection 22 may be made of a metal, such as Au.

Other constituent elements of the third example of the LN modulator are the same as those of the first example of the LN modulator depicted in FIGS. 2 and 3, and are therefore not described further. In the third example of the LN modulator, the light-receiving element 5 may be fixed to the substrate 1 by flip-chip bonding as in the second example of the LN modulator depicted in FIGS. 4 and 5 and the reflection groove protecting projection 21 may prevent the inflow of the underfill agent.

According to the LN modulator depicted in FIGS. 6 and 7, the reflection groove protecting projection 21 prevents the adhesive 16 from flowing into the part through which light travels in the space 7 inside the reflection groove 3. As a result, the part through which light travels in the space 7 inside the reflection groove 3 contains no substance that causes irregular reflection of light, such as air bubbles in the adhesive. This configuration enables light traveling through the space 7 inside the reflection groove 3 to fall onto the light-receiving element 5 without being reflected irregularly. Thus, the quantity of light received by the light-receiving element 5 increases. According to the LN modulator of FIGS. 6 and 7, the interconnect protecting projection 22 prevents the adhesive 16 from flowing toward the electric interconnects 17 and 18 for light-receiving elements. Because the light-receiving element 5 is placed on the reflection groove protecting projection 21, the height of the light-receiving element 5 can be determined by the height of the reflection groove protecting projection 21. Therefore, the height of the light-receiving element 5 can be adjusted by adjusting the height of the reflection groove protecting projection 21.

Figure 8:
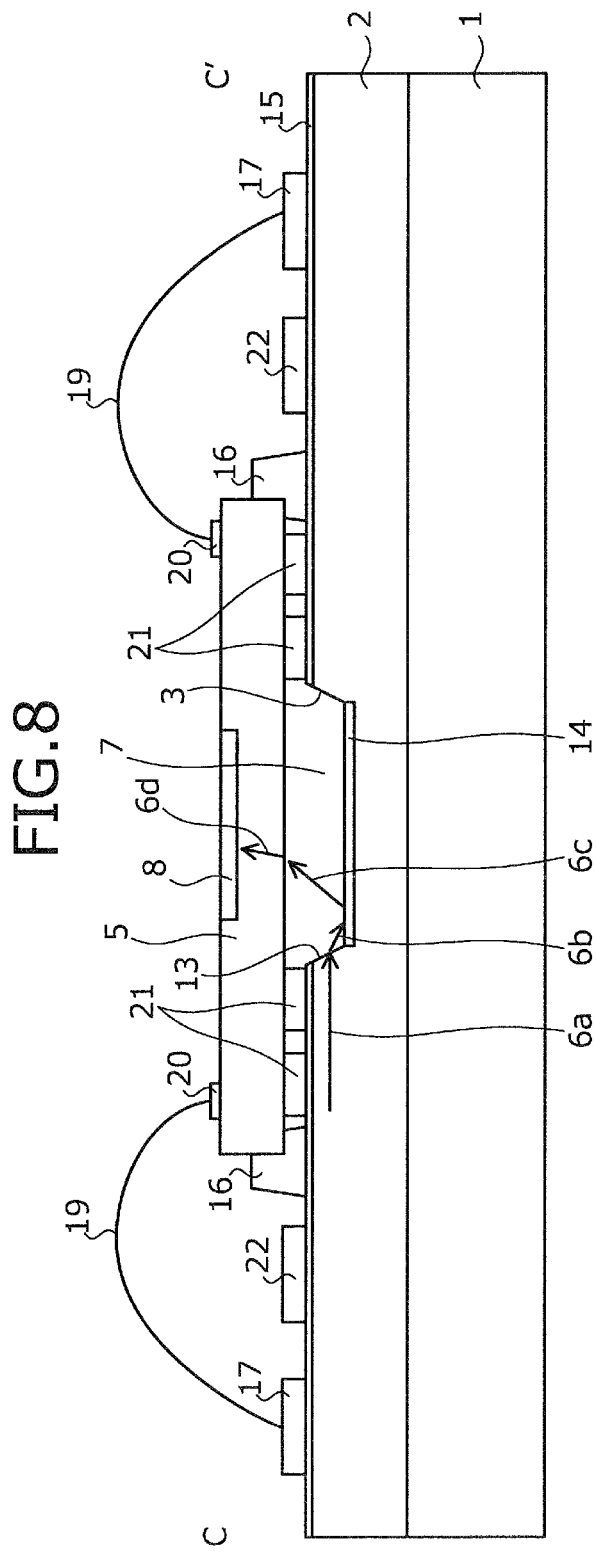
FIG. 8 depicts a fourth example of the LN modulator according to the embodiment.

FIG. 8 depicts a fourth example of the LN modulator according to the embodiment. FIG. 8 depicts a section of the LN modulator made along a cutting line C-C' of FIG. 6 in the direction of thickness of the substrate. FIG. 8 depicts the same section as depicted in FIG. 3.

As depicted in FIG. 8, in the fourth example of the LN modulator, multiple reflection groove protecting projections 21 are formed around the reflection groove 3. In the example depicted in FIG. 8, two reflection groove protecting projections 21 are formed under the light-receiving element 5. However, three or more reflection groove protecting projections 21 may be formed. One of the reflection groove protecting projections 21 may be formed underneath the electrodes 20 of the light-receiving element 5. Other constituent elements of the fourth example of the LN modulator are the same as those of the third example of the LN modulator of FIGS. 6 and 7, and therefore, are not described further.

According to the LN modulator depicted in FIG. 8, the reflection groove protecting projections 21 prevent the adhesive 16 from flowing into the part through which light travels in the space 7 inside the reflection groove 3. As a result, the quantity of light received by the light-receiving element 5 increases, as in the third example of the LN modulator of FIGS. 6 and 7. According to the LN modulator depicted in FIG. 8, the electrodes 20 of the light-receiving element 5 are supported from below by the reflection groove protecting projection 21 located underneath the electrodes 20. This structure causes ultrasonic waves to act on the electrodes 20 of the light-receiving element 5 more strongly during a wire bonding process than in a case where the space under the electrodes 20 of the light-receiving element 5 is left hollow and therefore, improves the bonding strength of the wires 19 wire bonded to the electrodes 20.

A pedestal that supports the electrodes 20 of the light-receiving element 5 from below may be provided in place of the reflection groove protecting projection 21 underneath the electrodes 20 of the light-receiving element 5, in order to cause ultrasonic waves to act on the electrodes 20 of the light-receiving element 5 more strongly during the wire bonding process. This method also improves the bonding strength of the wires 19 wire bonded to the electrodes 20, compared to a case where the space under the electrodes 20 of the light-receiving element 5 is left hollow.

When the light-receiving element 5 is fixed to the substrate 1 by flip-chip bonding, as in the second example of the LN modulator of FIGS. 4 and 5, multiple reflection groove protecting projections 21 may be formed inside a flip-chip bonding junction. In this case, the reflection groove protecting projections 21 prevent the underfill agent from flowing into the reflection groove 3.

Figure 9:
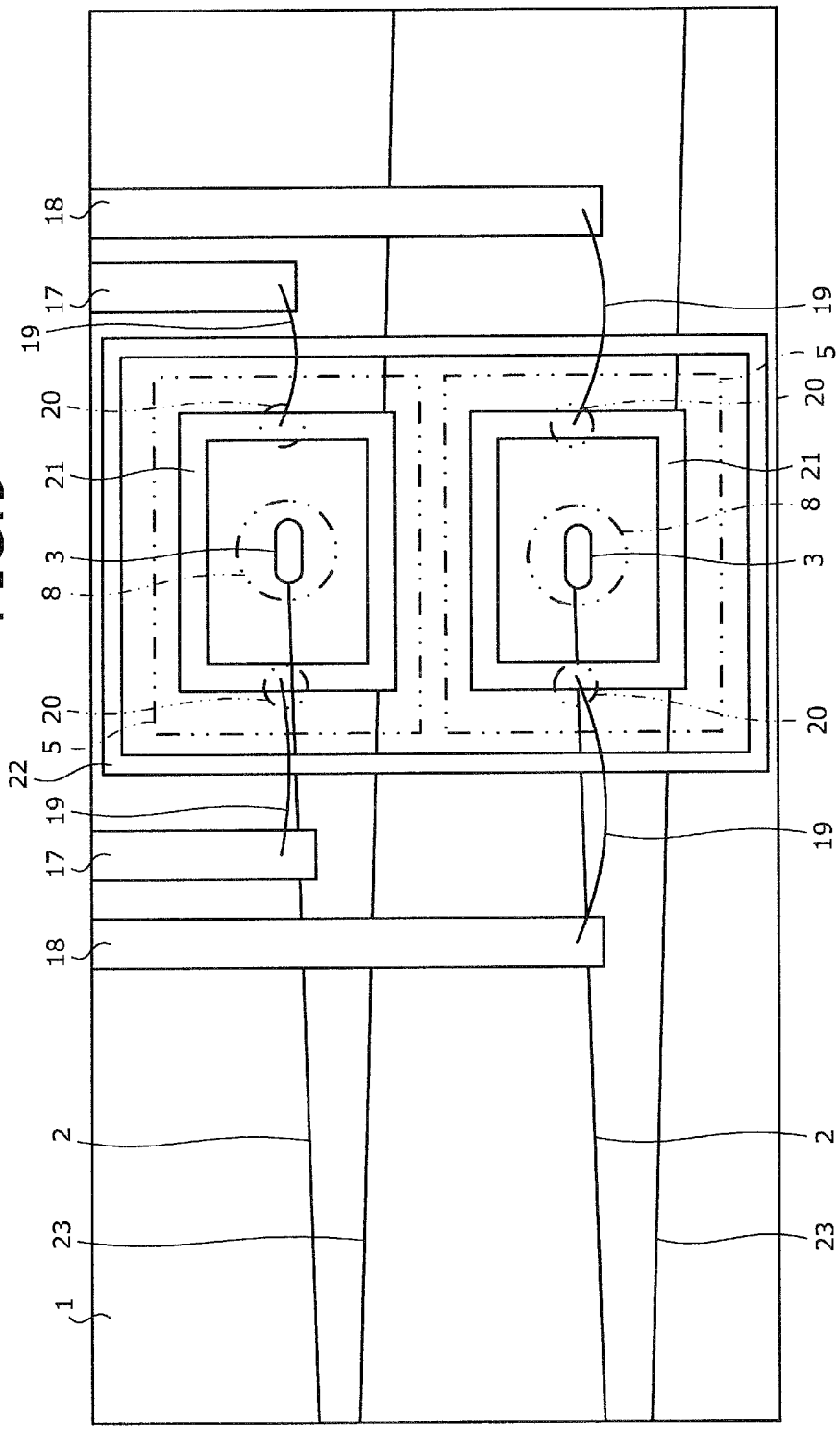
FIG. 9 depicts a first example of patterns of a reflection groove protecting projection and an interconnect protecting projection in the LN modulator.

FIG. 9 depicts a first example of patterns of the reflection groove protecting projection and the interconnect protecting projection in the LN modulator according to the embodiment. FIG. 9 depicts an enlarged view of a part where the light-receiving elements 5 are mounted. In FIG. 9, the light-receiving elements 5, the light-receiving units 8 of the light-receiving elements 5, and the electrodes 20 of the light-receiving elements 5 are indicated by dotted lines.

As depicted in FIG. 9, in the first example of patterns of the reflection groove protecting projection and the interconnect protecting projection, the reflection groove protecting projection 21 is located inside each light-receiving element 5 such that the reflection groove protecting projection 21 encompasses the reflection groove 3. The interconnect protecting projection 22 is located outside the light-receiving elements 5 such that the interconnect protecting projection 22 encompasses, for example, two light-receiving elements 5.

The reflection groove protecting projection 21 is formed underneath the electrodes 20 of the light-receiving element 5 and serves also as a pedestal that supports the electrodes 20 of the light-receiving element 5 from below. The height of the reflection groove protecting projection 21 or the interconnect protecting projection 22 is not limited to a specific height and may be 5 micrometers or more to 40 micrometers or less. In such a case, the reflection groove protecting projection 21 prevents the adhesive 16 from flowing into the reflection groove 3 and the interconnect protecting projection 22 prevents the adhesive 16 from flowing toward the electric interconnects 17 and 18 for light-receiving elements. In FIG. 9, reference numeral 23 denotes an optical waveguide that guides X-polarized signal light or Y-polarized signal light output from the LN modulator.

Figure 10:
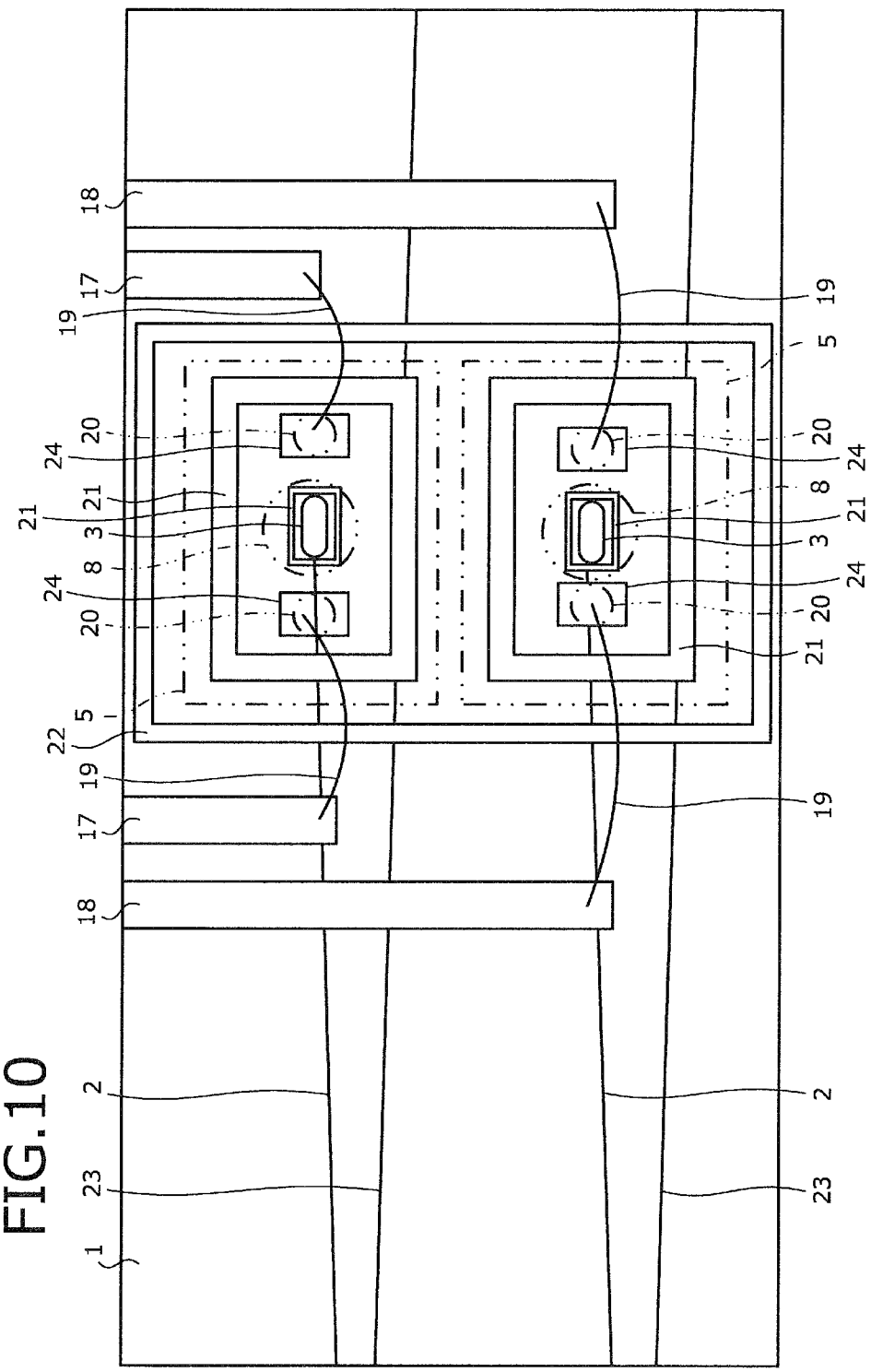
FIG. 10 depicts a second example of patterns of the reflection groove protecting projection and the interconnect protecting projection in the LN modulator.

FIG. 10 depicts a second example of patterns of the reflection groove protecting projection and the interconnect protecting projection in the LN modulator according to the embodiment. FIG. 10 depicts an enlarged view of the part where the light-receiving elements 5 are mounted. In FIG. 10, the light-receiving elements 5, the light-receiving units 8 of the light-receiving elements 5, and the electrodes 20 of the light-receiving elements 5 are indicated by dotted lines.

As depicted in FIG. 10, in the second example of patterns of the reflection groove protecting projection and the interconnect protecting projection, two reflection groove protecting projections 21 are formed. As a result, even if the adhesive 16 flows across the outer reflection groove protecting projection 21 to enter the area inside the outer reflection groove protecting projection 21, the inner reflection groove protecting projection 21 prevents the adhesive 16 from flowing into the reflection groove 3. The pattern depicted in FIG. 10 is applicable to a case where a large amount of the adhesive 16 is used. Three or more reflection groove protecting projections 21 may be formed in this example.

In addition to the reflection groove protecting projections 21, pedestals 24 that support the electrodes 20 of the light-receiving element 5 from below are separately disposed underneath the electrodes 20 of the light-receiving element 5. The pedestals 24 may be as high as the reflection groove protecting projections 21, and may be made of, for example, the same material as the material of the electric interconnects 17 and 18 for light-receiving elements or the material of the electrodes for modulation disposed on the optical waveguide 11 for X-polarization IQ modulation and the optical waveguide 12 for Y-polarization IQ modulation. For example, the pedestals 24 may be made of a metal, such as Au. The presence of the pedestals 24 causes ultrasonic waves to act on the electrodes 20 of the light-receiving element 5 more strongly during the wire bonding process than the case where the space under the electrodes 20 of the light-receiving element 5 is left hollow and therefore, improves the bonding strength of the wires 19 wire bonded to the electrodes 20.

Although one interconnect protecting projection 22 is indicated in the example of FIG. 10, multiple interconnect protecting projections 22 may be formed. Multiple interconnect protecting projections 22 exert higher capability of preventing the adhesive 16 from flowing toward the electric interconnects 17 and 18 for light-receiving elements. The interconnect protecting projection 22 may be formed to be higher than the reflection groove protecting projections 21. The higher interconnect protecting projection 22 also exerts higher capability of preventing the adhesive 16 from flowing toward the electric interconnects 17 and 18 for light-receiving elements. For example, the height of the reflection groove protecting projections 21 may be determined to be 5 micrometers and the height of the higher interconnect protecting projection 22 may be determined to be 20 micrometers.

Figure 11:
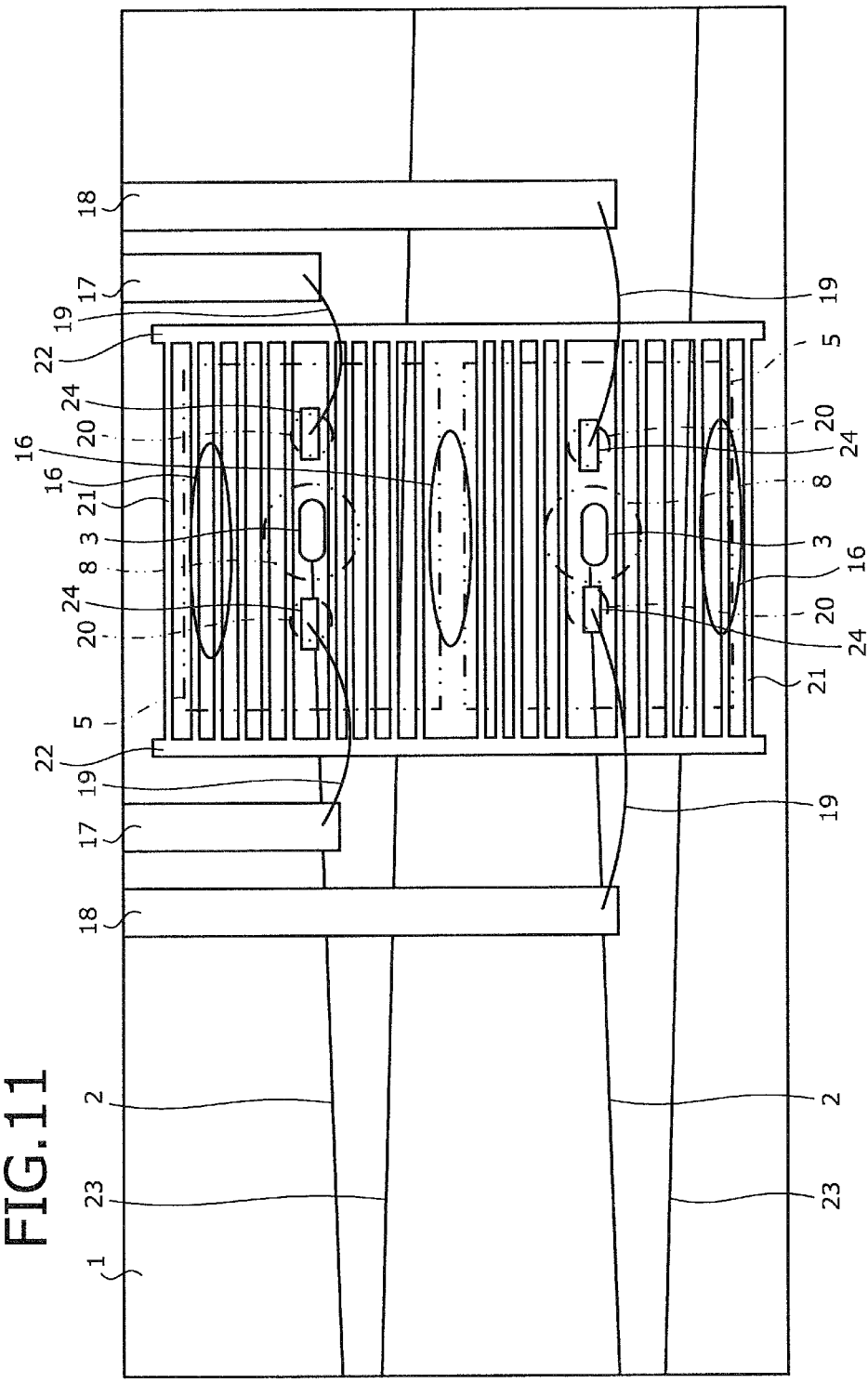
FIG. 11 depicts a third example of patterns of the reflection groove protecting projection and the interconnect protecting projection in the LN modulator.

FIG. 11 depicts a third example of patterns of the reflection groove protecting projection and the interconnect protecting projection in the LN modulator according to the embodiment. FIG. 11 depicts an enlarged view of the part where the light-receiving elements 5 are mounted. In FIG. 11, the light-receiving elements 5, the light-receiving units 8 of the light-receiving elements 5, and the electrodes 20 of the light-receiving elements 5 are indicated by dotted lines.

As depicted in FIG. 11, in the third example of patterns of the reflection groove protecting projection and the interconnect protecting projection, the reflection groove protecting projections 21 and the interconnect protecting projections 22 are formed into a ladder-like structure. The interconnect protecting projections 22 extend along the electric interconnects 17 and 18 for light-receiving elements, and the reflection groove protecting projections 21 are laid between the pair of interconnect protecting projections 22 to bridge the latter.

The reflection groove protecting projections 21 lie between the reflection groove 3 and the bonding spot for bonding by the adhesive 16. Even if the adhesive 16 flows into a gap between reflection groove protecting projections 21 adjacent to each other, the adhesive 16 flows along the reflection groove protecting projections 21 and is therefore prevented from flowing into the reflection groove 3. For example, the height of the reflection groove protecting projections 21 may be determined to be 5 micrometers and the height of the higher interconnect protecting projections 22 may be determined to be 20 micrometers.

Figure 12:
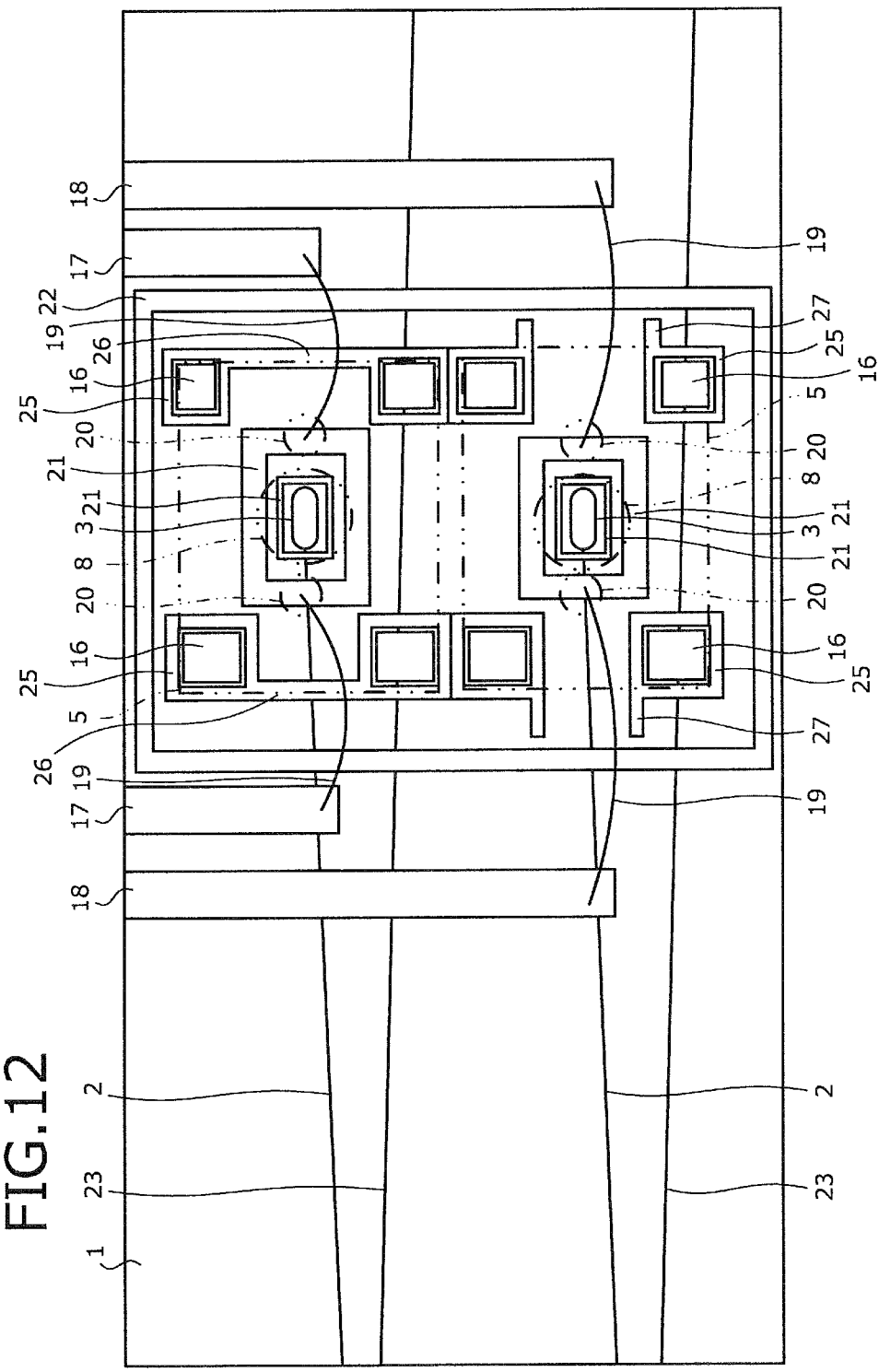
FIG. 12 depicts a fourth example of patterns of the reflection groove protecting projection and the interconnect protecting projection in the LN modulator.

FIG. 12 depicts a fourth example of patterns of the reflection groove protecting projection and the interconnect protecting projection in the LN modulator according to the embodiment. FIG. 12 depicts an enlarged view of the part where the light-receiving elements 5 are mounted. In FIG. 12, the light-receiving elements 5, the light-receiving units 8 of the light-receiving elements 5, and the electrodes 20 of the light-receiving elements 5 are indicated by dotted lines.

As depicted in FIG. 12, in the fourth example of patterns of the reflection groove protecting projection and the interconnect protecting projection, two reflection groove protecting projections 21 encompass the reflection groove 3 and one of the reflection groove protecting projections 21 that is located outside serves also as a pedestal that supports the electrode 20 of the light-receiving element 5 from below. On the surface of the substrate 1, for example, bank-shaped projections 25 are formed, which encompass areas where the adhesive 16 is applied. The adhesive 16 is applied in these closed areas encompassed by the projections 25. For example, the projections 25 are formed at the locations corresponding to the four corners of the light-receiving element 25 on the substrate 1. The height and material of the projections 25, for example, may be the same as those of the reflection groove protecting projections 21.

In the example depicted in FIG. 12, on the light-receiving element 5 located close to the electric interconnects 17 and 18 for light-receiving elements, projections 26 respectively connecting one projection 25 to another projection 25 are formed in parallel with the electric interconnects 17 and 18 for light-receiving elements. In this structure, when the adhesive 16 flows out of the closed areas encompassed by the projections 25, the adhesive 16 flows along the projections 26. Thus, the flow of the adhesive 16 is prevented from proceeding toward the electric interconnects 17 and 18 for light-receiving elements.

On the light-receiving element 5 located distant from the electric interconnects 17 and 18 for light-receiving elements, projections 27 extends outward from each projection 25. The reason for this structure is that when the adhesive 16 flows out of the closed area encompassed by the projection 25, directing the flow of the adhesive 16 outward poses no problem because the electric interconnects 17 and 18 for light-receiving elements are distant from the projection 25.

Encompassing the application areas for the adhesive 16 by the projections 25 prevents the adhesive 16 applied in the application areas from flowing into the reflective groove 3. In addition, when the adhesive 16 is applied to the substrate 1, the projections 25 serve as marks indicating the application areas and form vessels that receive the adhesive 16. As a result, a proper amount of the adhesive 16 can be applied easily.

Figure 13:
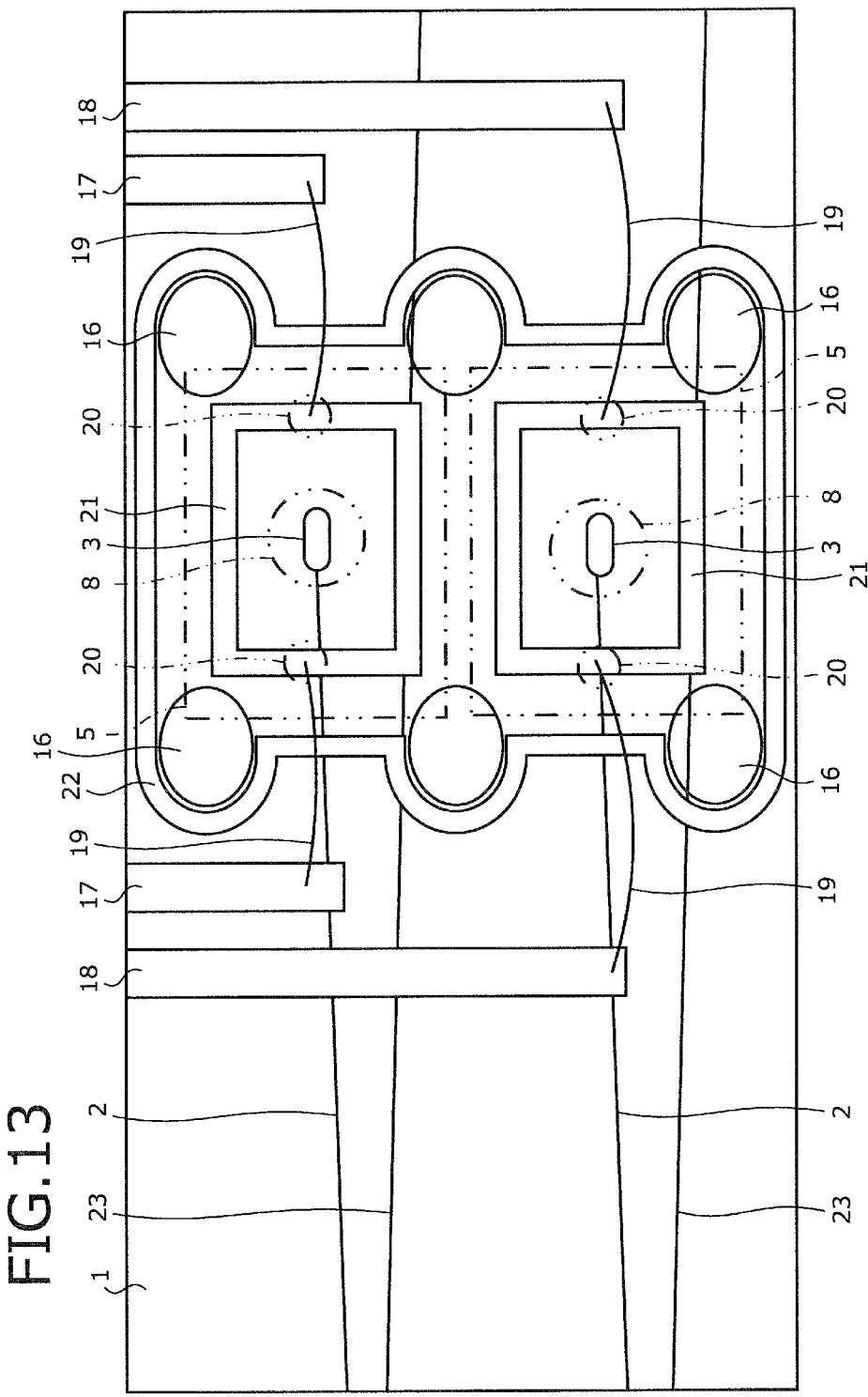
FIG. 13 depicts a fifth example of patterns of the reflection groove protecting projection and the interconnect protecting projection in the LN modulator.

FIG. 13 depicts a fifth example of patterns of the reflection groove protecting projection and the interconnect protecting projection in the LN modulator according to the embodiment. FIG. 13 depicts an enlarged view of the part where the light-receiving elements 5 are mounted. In FIG. 13, the light-receiving elements 5, the light-receiving units 8 of the light-receiving elements 5, and the electrodes 20 of the light-receiving elements 5 are indicated by dotted lines.

As depicted in FIG. 13, in the fifth example of patterns of the reflection groove protecting projection and the interconnect protecting projection, the interconnect protecting projection 22 bulges out along areas where the adhesive 16 is applied. As a result, the areas where the adhesive 16 is applied are expanded. The patterns depicted in FIG. 13 are applicable to a case where a large amount of the adhesive 16 is used.

Figure 14:
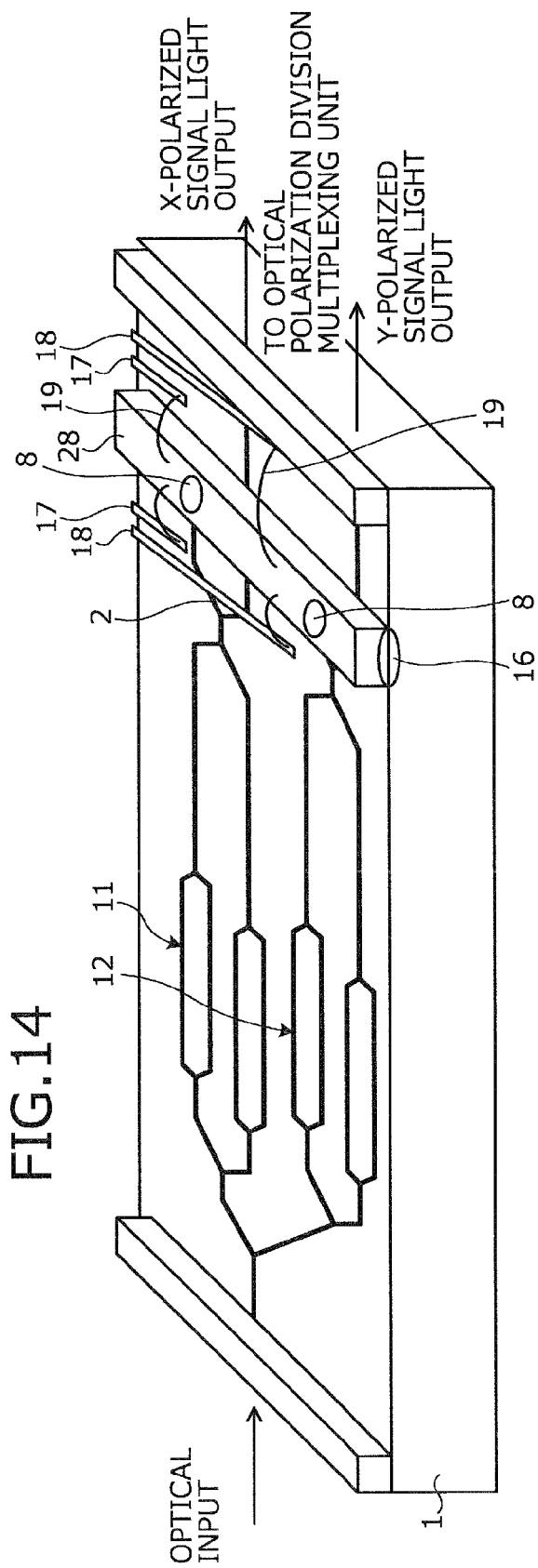
FIG. 14 depicts a fifth example of the LN modulator according to the embodiment.

FIG. 14 depicts a fifth example of the LN modulator according to the embodiment. As depicted in FIG. 14, a light-receiving element 28 having two light-receiving units 8 is used in place of two light-receiving elements 5 in the first example of the LN modulator of FIG. 2. The light-receiving element 28 may have a length equal to the width of the substrate 1 in a direction crossing the direction of the input of light to the LN modulator or the direction of output of signal light output from the LN modulator. In this case, the light-receiving element 28 may be fixed to the substrate 1 by the adhesive 16 applied from the side faces of the substrate 1.

Other constituent elements of the fifth example of the LN modulator are the same as those of the first example of the LN modulator depicted in FIGS. 2 and 3, and are therefore not described further. The light-receiving element 28 having two light-receiving units 8 may be used also in the second example of the LN modulator depicted in FIGS. 4 and 5, the third example of the LN modulator depicted in FIGS. 6 and 7, and the fourth example of the LN modulator depicted in FIG. 8.

Figure 15:
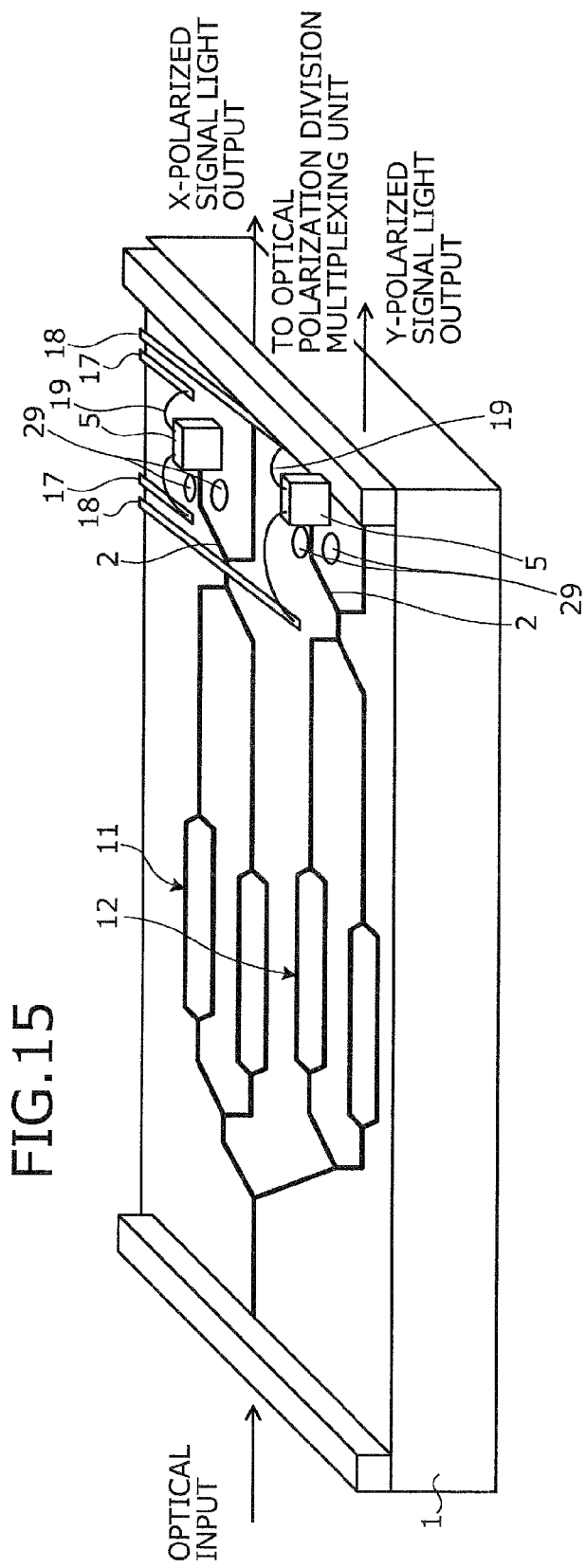
FIG. 15 depicts a sixth example of the LN modulator according to the embodiment.
Figure 16:
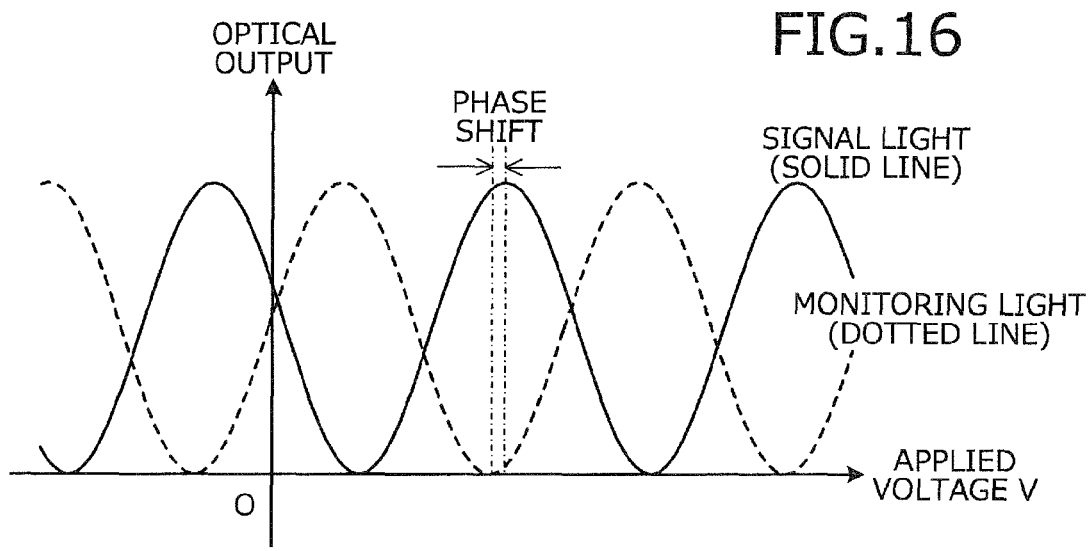
FIG. 16 depicts waveforms of signal light and monitoring light that are shifted in phase with respect to one another.

FIG. 15 depicts a sixth example of the LN modulator according to the embodiment. FIG. 16 depicts waveforms of signal light and monitoring light that are shifted in phase with respect to one another. In FIG. 16, the horizontal axis represents voltage applied to a Mach-Zehnder interferometer and the vertical axis represents optical output power. As depicted in FIG. 15, the sixth example of the LN modulator is implemented by forming guard grooves 29 immediately in front of the light-receiving elements 25 in the first example of the LN modulator of FIG. 2.

Undesirable light such as, for example, a coupling loss component of input light, an excess loss component of a coupler, etc. may arise. When undesirable light enters the reflective groove 3 and is received by the light-receiving element 5, the phase of the monitoring light shifts, as depicted in FIG. 16. This may cause the phases of the signal light and monitoring light to shift from the ideal state, i.e., a phase difference between the signal light and the monitoring light shifts from 180 degrees. When the phases of the signal light and monitoring light shift from the ideal state, control of the operating point of the LN modulator becomes difficult. When undesirable light is present, the undesirable light is preferably to be prevented from entering the reflective groove 3. The guard grooves 29 keep the undesirable light from entering the reflective groove 3.

Other constituent elements of the sixth example of the LN modulator are the same as those of the first example of the LN modulator depicted in FIGS. 2 and 3, and are therefore not described further. The guard grooves 29 may be formed also in the second example of the LN modulator depicted in FIGS. 4 and 5, the third example of the LN modulator depicted in FIGS. 6 and 7, the fourth example of the LN modulator depicted in FIG. 8, and the fifth example of the LN modulator depicted in FIG. 14.

Figure 17:
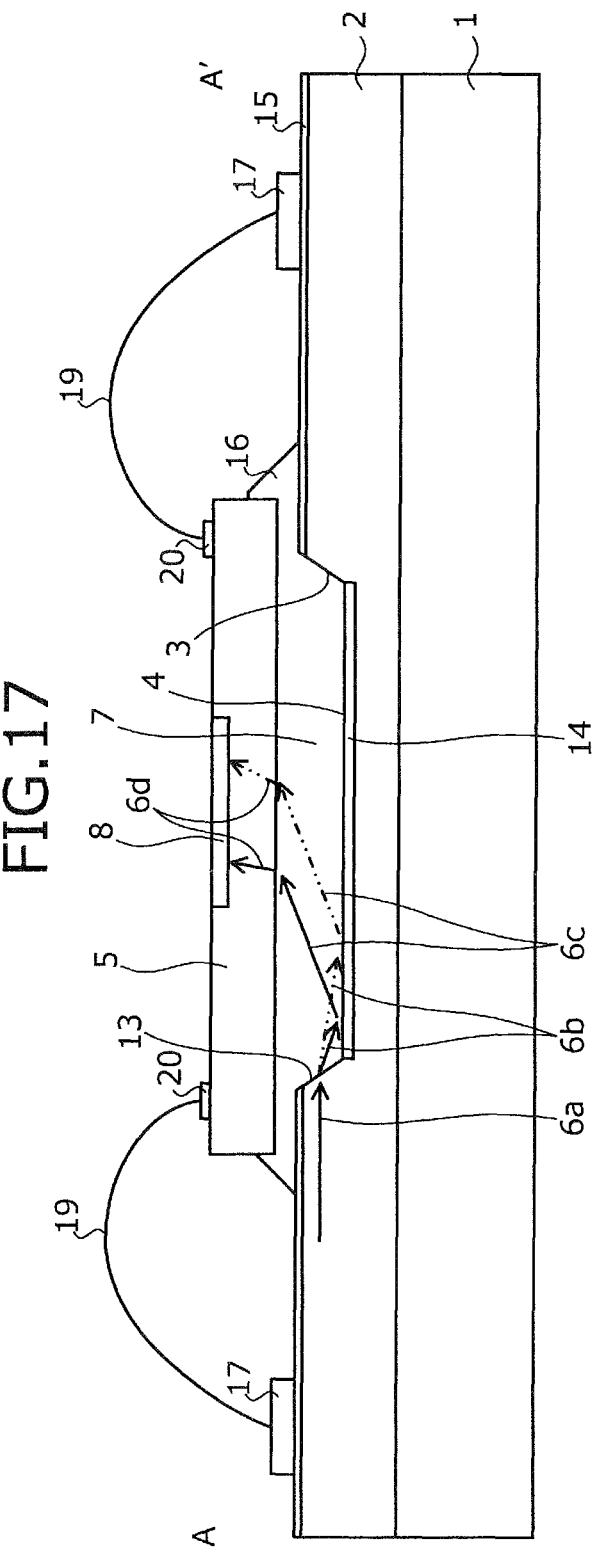
FIG. 17 depicts a seventh example of the LN modulator according to the embodiment and depicts a section of the LN modulator made along the cutting line A-A' in FIG. 2.

FIG. 17 depicts a seventh example of the LN modulator according to the embodiment. FIG. 17 depicts a section of the LN modulator made along the cutting line A-A' in FIG. 2 in the direction of thickness of the substrate. FIG. 17, therefore, depicts the same section as depicted in FIG. 3. As depicted in FIG. 17, the seventh example of the LN modulator is implemented by filling the space 7 of the reflection groove 3 with the adhesive 16 in the first example of the LN modulator depicted in FIG. 3. When the space 7 of the reflection groove 3 is filled with the adhesive 16, the adhesive 16 preferably includes no air bubbles.

It is assumed, for example, that when the depth of the reflection groove 3 is 3 micrometers, the angle that the sloped surface 13 of the reflection groove 3 makes with respect to the direction of thickness of the substrate 1 varies within a range of 10 degrees to 15 degrees. For this case of the varying angle of the sloped surface 13, a light path for the light 6b coming out of the center of the sloped surface 13 into the reflection groove 3 is indicated by a two-dot chain line in FIG. 17. When the space 7 of the reflection groove 3 is filled with the adhesive 16, the light 6b having come out of the center of the sloped surface 13 into the reflection groove 3 is incident to the light-receiving unit 8 of the light-receiving element 5 at points of arrival staggered by, for example, 31 micrometers.

For this case of the varying angle of the sloped surface 13 in the first example of the LN modulator of FIG. 3, a light path for the light 6b coming out of the center of the sloped surface 13 into the reflection groove 3 is indicated by a two-dot chain line in FIG. 3. When the space 7 of the reflection groove 3 is filled with air, the light 6b having come out of the center of the sloped surface 13 into the reflection groove 3 is incident to the light-receiving unit 8 of the light-receiving element 5 at points of arrival staggered by, for example, 13 micrometers.

Therefore, if the light-receiving unit 8 of the light-receiving element 5 is wide, the LN modulators of the first and seventh examples may be used. However, if the light-receiving unit 8 of the light-receiving element 5 is narrow, use of the LN modulator of the first example is preferable.

Other constituent elements of the seventh example of the LN modulator are the same as those of the first example of the LN modulator of FIGS. 2 and 3, and are therefore not described further. The space 7 of the reflection groove 3 may be filled with the adhesive 16 that includes no air bubbles in the second example of the LN modulator depicted in FIGS. 4 and 5, the third example of the LN modulator depicted in FIGS. 6 and 7, the fourth example of the LN modulator depicted in FIG. 8, the fifth example of the LN modulator depicted in FIG. 14, or the sixth example of the LN modulator depicted in FIG. 15.

FIGS. 18, 19, and 20 depict an example of a fabrication method for the optical device of the embodiment.

In FIG. 18, as indicated by reference numeral 101, the substrate 1 is prepared first. Then, as indicated by reference numeral 102, for example, Ti (titanium) is vapor-deposited on the surface of the substrate 1 to form, for example, a Ti film 31 of 1000 Angstrom in thickness. Subsequently, as indicated by reference numeral 103, a photoresist 32 is applied to the Ti film 31 covering the surface thereof with a photoresist film of, for example, about 1 micrometers in thickness. The photoresist 32 is then subjected to patterning treatment by photolithography and the Ti film is subjected to patterning treatment by dry etching or wet etching.

During the patterning of the Ti film 31, an ordinary directional coupler and a Mach-Zehnder interferometer with a Y-branch are formed using an optical modulator, optical switch, filter, or variable optical attenuator. Subsequently, as indicated by reference numeral 104, Ti is caused to spread into the substrate 1 under a temperature of, for example, 1000 degrees C. to 1100 degrees C. to form the optical waveguide 2. The optical waveguide 2 include, for example, the optical waveguide 11 for X-polarization IQ modulation, the optical waveguide 12 for Y-polarization IQ modulation, and the optical waveguides 2 for monitoring branching from the optical waveguides 11 and 12, which are included in the LN modulator of FIG. 2. The optical waveguide 2 may be formed using Mg (magnesium) instead of Ti and by proton exchange method.

As indicated by reference numeral 105 in FIG. 19, a photoresist 33 is applied to the surface of the substrate 1 and is subjected to patterning treatment by photolithography to create a pattern for forming the reflection groove 3. As indicated by reference numeral 106, the pattern is then subjected to post-baking treatment, by which a solvent and developer remaining on the patterned photoresist 33 are eliminated to enhance the adhesion between the photoresist 33 and the substrate 1.

Subsequently, as indicated by reference numeral 107, the reflection groove 3 is formed by, for example, dry etching, such as reactive ion etching (RIE), using the patterned photoresist 33 as a mask. When the reflection groove 3 is formed, the guard grooves 29 that keep undesirable light from entering the reflection groove 3 may also be formed. Following the formation of the groove, as indicated by reference numeral 108, the photoresist 33 used as the mask is eliminated.

Then, as indicated by reference numeral 109 in FIG. 20, a buffer layer 34 is formed on the surface of the substrate 1 by, for example, sputtering or an electron beam (EB) vapor-depositing apparatus. The thickness of the buffer layer 34 is optimized according to a necessary band or electroreflectance, and may be determined to be, for example, about 0.5 micrometers to 1.0 micrometers.

Then, as indicated by reference numeral 110, an Si layer 35 is formed on the surface of the buffer layer 34 by, for example, sputtering. The thickness of the Si layer 35 may be determined to be, for example, about 0.1 micrometers. The buffer layer 34 and the Si layer 35 make up, for example, the buffer layer/Si layer 15 of the LN modulator of FIG. 3.

Subsequently, as indicated by reference numeral 111, Au is vapor-deposited on the surface of the Si layer 35 using, for example, an EB vapor-depositing apparatus, to form an Au film serving as a substrate for electric interconnects and electrodes. When the Au film for the electrode substrate is formed, for example, the reflection film 14 of the LN modulator of FIG. 3 may also be formed. The thickness of the Au film for the electrode substrate may be determined to be, for example, about 0.1 micrometers.

The Au film for the electrode substrate is then coated with a photoresist, which is subjected to patterning treatment by photolithography and is etched to form the patterned Au film. Au plating is then performed to form an electrode 36 on the Au film for the electrode substrate. The thickness of the Au plating film is optimized according to the required band and electroreflectance, and may be determined to be, for example, about 5 micrometers to 40 micrometers. The electrode 36 includes, for example, the electric interconnects 17 and 18 for light-receiving elements, the modulation electrode on the optical waveguide 11 for X-polarization IQ modulation, and the modulation electrode on the optical waveguide 12 for Y-polarization IQ modulation, respectively included in the LN modulator depicted in FIG. 2. The film serving as the substrate for the electric interconnects and electrodes or the electrode 36 may be formed using a metal other than Au, such as Cu (copper).

When the electrode 36 is formed, for example, the reflection groove protecting projection 21 and interconnect protecting projection 22 of the LN modulator depicted in FIGS. 6 and 7; the pedestal 24 of the pattern of FIG. 10; and the projections 25 to 27 of the pattern of FIG. 12 may also be formed. The thickness of the reflection groove protecting projection 21, the interconnect protecting projection 22, the pedestal 24, and the projections 25 to 27 may be determined to be, for example, about 5 micrometers to 40 micrometers.

Subsequently, the substrate 1 is cut into an optical device chip of a desired size. The light-receiving element 5 is then fixed to the optical device chip by die bonding using the adhesive 16 or by flip-chip bonding. For example, in the case of the LN modulator of FIGS. 6 and 7, the adhesive 16 is applied at a desired location on the LN modulator chip, using a device capable of controlling the volume of the adhesive 16, such as a dispenser, so that the adhesive 16 does not flow out of the reflection groove protecting projection 21 and the interconnect protecting projection 22.

With respect to corners of pads of the electric interconnects 17 and 18 for light-receiving elements, the position of the light-receiving element 5 is adjusted while an image is checked using a camera to set the light-receiving element 5 in place so that a pattern on the surface of the light-receiving element 5 is located at a desired position. For example, the center of the light-receiving unit 8 of the light-receiving element 5 may be used as a pattern for alignment. After the light-receiving element 5 is set in place, the LN modulator chip is exposed to UV-rays to cure the adhesive 16, which fixes the light-receiving element 5 to the LN modulator chip. Subsequently, the chip is subjected to a heat treatment to cure the chip. Finally, wire bonding is performed to electrically connect the electrodes 20 of the light-receiving element 5 to the electric interconnects 17 and 18 for light-receiving elements.

According to the fabrication method of the optical device depicted in FIGS. 18 to 20, the optical device that allows light traveling through the optical waveguide 2 to be received by the light-receiving element 5 fixed to the surface of the substrate 1 can be fabricated. According to the fabrication method for the optical device depicted in FIGS. 18 to 20, when the electrode 36 is formed, the reflection groove protecting projection 21, the interconnect protecting projection 22, the pedestal 24, and the projections 25 to 27 are also formed. Manufacturing processes, therefore, do not need to be increased. According to the fabrication method for the optical device of FIGS. 18 to 20, when the substrate for electrodes is formed, the reflection film 14 is also formed. Manufacturing processes, therefore, do not need to be increased. Consequently, increases in manufacturing costs are suppressed.

The optical device enables light traveling through an optical waveguide to be received by a light-receiving element fixed on the surface of a substrate. The fabrication method for an optical device enables an optical device that enables a light-receiving element fixed on the surface of a substrate to receive light traveling through an optical waveguide to be fabricated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical device comprising:
   a substrate having an electrooptical effect, and including an optical waveguide that guides light and a reflection groove having a bottom face that reflects light output from the optical waveguide;
   a light-receiving element positioned above the reflection groove and fixed to the substrate; and
   a reflection groove protecting projection formed around the reflection groove, wherein
   the light output from the optical waveguide into the reflection groove is reflected by the bottom face of the reflection groove while traveling through a space inside the reflection groove and is incident to the light-receiving element,
   the reflection groove protecting projection prevents adhesive that fixes the light-receiving element to the substrate from flowing into a part through which the light travels in the space inside the reflection groove, and
   the reflection groove protecting projection is between the substrate and the light-receiving element and in contact with the substrate and the light-receiving element such that a distance of the light-receiving element from the substrate is equal to a height of the reflection groove protecting projection.

2. The optical device according to claim 1, wherein a part through which the light travels in the space inside the reflection groove is filled with air.

3. The optical device according to claim 1, wherein the reflection groove has an end face from which the light from the optical waveguide is output, the end face being a sloped surface that refracts the light output from the optical waveguide, causing the light to travel toward the bottom face of the reflection groove.

4. The optical device according to claim 3, wherein the sloped surface forms, with respect to a direction of thickness of the substrate, an angle that is smaller than an angle at which the light traveling through the optical waveguide is totally reflected by the sloped surface.

5. The optical device according to claim 1, comprising an interconnect protecting projection that prevents the adhesive from flowing toward an electric interconnect electrically connected to a light-receiving element, the interconnect protecting projection being formed between the electric interconnect and a bonding location for bonding by the adhesive, wherein
the interconnect protecting projection has from a surface of the substrate, a height that is greater than the height of the reflection groove protecting projection, from the surface of the substrate.

6. The optical device according to claim 1, wherein a wire is connected to the light-receiving element by wire bonding, above any one among the adhesive and the reflection groove protecting projection.

7. The optical device according to claim 1, wherein the light-receiving element is fixed to the substrate by flip-chip bonding.

8. The optical device according to claim 3, wherein the sloped surface makes an angle of 5 degrees or more to 20 degrees or less with respect to a direction of thickness of the substrate.

9. The optical device according to claim 1, comprising a reflection film formed on the bottom face of the reflection groove.

* * * * *